US010012796B2

(12) United States Patent
Xiao et al.

(10) Patent No.: US 10,012,796 B2
(45) Date of Patent: Jul. 3, 2018

(54) MUX/DEMUX COMPRISING CAPILLARY FILTER BLOCK AND METHODS OF PRODUCING THE SAME

(71) Applicant: Alliance Fiber Optic Products, Inc., Sunnyvale, CA (US)

(72) Inventors: Qijun Xiao, Fremont, CA (US); Dong Gui, Sunnyvale, CA (US); Andy Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/388,556

(22) Filed: Dec. 22, 2016

(65) Prior Publication Data

US 2017/0184789 A1    Jun. 29, 2017

Related U.S. Application Data

(60) Provisional application No. 62/387,574, filed on Dec. 28, 2015.

(51) Int. Cl.
  *H04J 14/00* (2006.01)
  *H04J 14/02* (2006.01)
  (Continued)

(52) U.S. Cl.
  CPC ....... *G02B 6/29367* (2013.01); *G02B 6/2938* (2013.01); *G02B 6/29398* (2013.01); *H04B 10/27* (2013.01); *H04J 14/02* (2013.01)

(58) Field of Classification Search
  None
  See application file for complete search history.

(56) References Cited

U.S. PATENT DOCUMENTS

| | | | | |
|---|---|---|---|---|
| 5,583,683 A | * | 12/1996 | Scobey | G02B 5/288 359/587 |
| 6,201,908 B1 | * | 3/2001 | Grann | G02B 6/29358 385/24 |

(Continued)

OTHER PUBLICATIONS

Lee et al., "Analysis of Dimensional Tolerance for an Optical Demultiplexer of a Highly Alignment Tolerant 4×25 Gb/s ROSA Module", Optical Society of America, 2014, vol. 22, No. 4, Optical Society of America.

*Primary Examiner* — Ken V Vanderpuye
*Assistant Examiner* — Jai Lee
(74) *Attorney, Agent, or Firm* — Robert L. Branham

(57) ABSTRACT

A multiplexer/demultiplexer is provided comprising a capillary filter block, a capillary adhesive, a signal-routing block, and an index-matching adhesive. The capillary adhesive resides in the capillary interstices of the capillary filter block and the index-matching adhesive forms an optical and mechanical interface between the signal-routing block and the capillary filter block. The layer thickness of the index-matching adhesive accommodates for extra-planar surface irregularities in the bonding face of the signal routing block and extra-planar variations along the proximal ends of the component filter blocks of the capillary filter block. The capillary filter block can be formed from a plurality of component filter blocks by dicing multiple component filter blocks from a filter block substrate, placing the component filter blocks adjacent to one another, and using capillary force to draw adhesive between adjacent sidewalls of component filter blocks.

21 Claims, 6 Drawing Sheets

(51) Int. Cl.
*G02B 6/293* (2006.01)
*H04B 10/27* (2013.01)

(56) References Cited

U.S. PATENT DOCUMENTS

| | | | | |
|---|---|---|---|---|
| 6,870,976 | B2* | 3/2005 | Chen | G02B 6/29367 |
| | | | | 264/1.1 |
| 6,941,047 | B2 | 9/2005 | Capewell et al. | |
| 8,340,522 | B2* | 12/2012 | Yu | G02B 6/2706 |
| | | | | 398/41 |
| 8,488,244 | B1 | 7/2013 | Li et al. | |
| 8,537,468 | B1* | 9/2013 | Wang | G02B 27/0025 |
| | | | | 359/619 |
| 9,323,065 | B2 | 4/2016 | Wang et al. | |
| 2004/0042736 | A1* | 3/2004 | Capewell | G02B 6/29367 |
| | | | | 385/89 |
| 2015/0117823 | A1* | 4/2015 | Panotopoulos | G02B 6/3845 |
| | | | | 385/89 |
| 2015/0125163 | A1* | 5/2015 | Gui | H04B 10/572 |
| | | | | 398/201 |
| 2016/0187585 | A1* | 6/2016 | Yue | G02B 6/2938 |
| | | | | 398/82 |
| 2017/0115459 | A1* | 4/2017 | Kamo | G02B 6/4244 |
| 2017/0351041 | A1* | 12/2017 | Mathai | G02B 6/4206 |

\* cited by examiner

MUX/DEMUX COMPRISING CAPILLARY FILTER BLOCK AND METHODS OF PRODUCING THE SAME

CROSS-REFERENCE TO RELATED APPLICATIONS

This application claims the benefit of U.S. Provisional Application Ser. No. 62/387,574, filed Dec. 28, 2015.

BACKGROUND

Field

The present disclosure relates to optical multiplexers/demultiplexers.

Technical Background

Wavelength division multiplexing (WDM) is the name given to the technology employed to add (or multiplex) a number of distinct wavelengths of light onto a single optical fiber, increasing information capacity and enabling bi-directional flow of signals. It is contemplated that, by combining multiple channels of light into a single channel, current multiplexer/demultiplexer assemblies can reach data transmission speeds up to 160 TB/s, or more.

Multiplexer/demultiplexer assemblies can be used as components in passive optical networks (PON). A PON is a form of fiber-optic access network typically comprised of an optical line terminal (OLT) at a hub and a number of optical network units (ONU) near end users. Multiplexer/demultiplexer assemblies are one of a number of components such as circulators, isolators, and filters that can make up the PON.

BRIEF SUMMARY

The present inventors have recognized that, because of limited space in data centers and the rapid growth of data traffic, there is an increasing need for capacity in optical communication systems. Increasing port density requires assemblies with ever smaller form factors. Integrating multiple components onto a single substrate is one of the key challenges facing miniaturization. Carefully locating and interrelating the components in a multiplexer/demultiplexer assembly can reduce the space required for the assembly and thus increase the number of assemblies and data rate of a given PON.

According to the subject matter of the present disclosure, optical multiplexers/demultiplexers of minimal device footprint are provided by arranging the thin-film filters, the filter blocks, and the signal-routing block of the device such that a multiplexed optical signal entering the signal-routing block through the common port can pass through the signal-routing block and the filter blocks in a back-and-forth progression to successive ones of the thin-film filters for successive wavelength-selective transmission and reflection.

In accordance with one embodiment of the present disclosure, a multiplexer/demultiplexer is provided comprising a common port, a plurality of input/output ports, a capillary filter block, a capillary adhesive, a signal-routing block, and an index-matching adhesive. The capillary filter block is made from a plurality of component filter blocks. Each of the component filter blocks of the capillary filter block comprises a proximal end, a distal end, and a pair of capillary side walls extending from the proximal end of the component filter block to the distal end of the component filter block. Each of the component filter blocks of the capillary filter block comprises a thin-film filter disposed at the distal end of the component filter block. The component filter blocks are arranged side-by-side, creating respective capillary interstices between adjacent capillary side walls of the component filter blocks. The capillary adhesive resides in the capillary interstices of the capillary filter block to secure the component filter blocks to each other with the thin-film filters of each component filter block in a common filter plane. The index-matching adhesive forms an optical and mechanical interface between a bonding face of the signal-routing block and the capillary filter block along the proximal ends of the component filter blocks of the capillary filter block. The layer thickness of the index-matching adhesive is sufficient to accommodate extra-planar surface irregularities in the bonding face of the signal routing block and extra-planar variations along the proximal ends of the component filter blocks of the capillary filter block. The capillary adhesive and the index-matching adhesive may be temporally discontinuous.

In particular embodiments, the capillary filter block and the signal-routing block are arranged such that a multiplexed optical signal entering the signal-routing block through the common port can pass through the signal-routing block and the capillary filter block in a back-and-forth progression to successive ones of the thin-film filters for successive wavelength-selective transmission and reflection at the input/output ports. And in other embodiments, the capillary filter block and the signal-routing block are arranged such that demultiplexed optical signals entering the capillary filter block through the input/output ports can pass through the signal-routing block and the capillary filter block in a back-and-forth progression for multiplexing at successive ones of the thin-film filters and multiplexed transmission through the common port.

In accordance with another embodiment of the present disclosure, the multiplexer/demultiplexer comprises a chemical or physical demarcation between the capillary adhesive and the index-matching adhesive.

In accordance with yet another embodiment of the present disclosure, a method of producing a plurality of capillary filter blocks is described. The method comprises providing a plurality of component filter block strips and a reference fixture comprising a plurality of alignment platforms extending from a common side of the reference fixture. The plurality of alignment platforms have at least a first side and a second side and a substantially planar top, and the planar tops of the alignment platforms collectively define a common alignment plane. The filter block strips are positioned such that respective length dimensions of the component filter block strips are aligned with the length dimension of the reference fixture. The component filter block strips lie atop at least two of the alignment platforms in a parallel side-by-side progression such that the plurality of thin-film filters at the distal ends of the component filter block strips contact the alignment platforms in the common alignment plane. Adjacent side walls of the positioned component filter block strips form capillary interstices between adjacent component filter block strips. A capillary adhesive is applied to the proximal end of the component filter block strips such that the capillary adhesive is distributed within the capillary interstices between the component filter block strips at least by capillary force and the capillary adhesive is cured such that the plurality of component filter blocks form a capillary filter block strip. The capillary filter block strip is diced to produce a plurality of capillary filter blocks, each of the capillary filter blocks forming component filter blocks.

In accordance with yet another embodiment described herein, a method of producing a multiplexer/demultiplexer is provided. An optical and mechanical interface between a bonding face of a signal-routing block and a bonding face of a capillary filter block is formed using an index-matching adhesive. The layer thickness of the index-matching adhesive is sufficient to accommodate extra-planar surface irregularities in the bonding face of the signal routing block and extra-planar variations along the proximal ends of the component filter blocks of the capillary filter block. The index-matching adhesive is cured such that the signal-routing block and the capillary filter block are in fixed alignment.

Although the concepts of the present disclosure are described herein with primary reference to a 4-port mux/demux configuration of specific design/orientation, it is contemplated that the concepts will enjoy applicability to any mux/demux configuration and need not be limited to a specific number of ports, a specific optical pitch, or a specific optical orientation.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
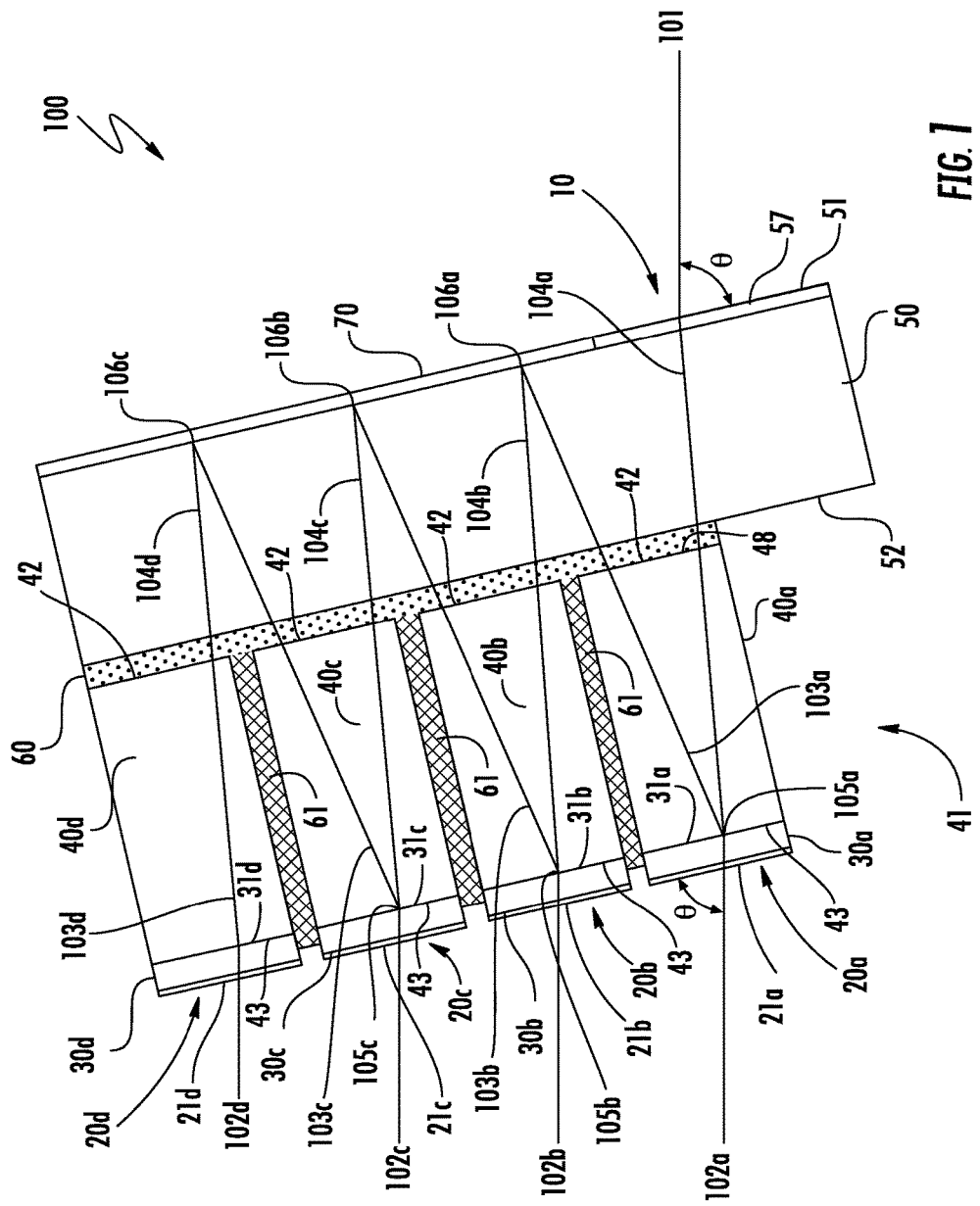
FIG. 1 illustrates a multiplexer/demultiplexer according to one embodiment of the present disclosure.
Figure 2:
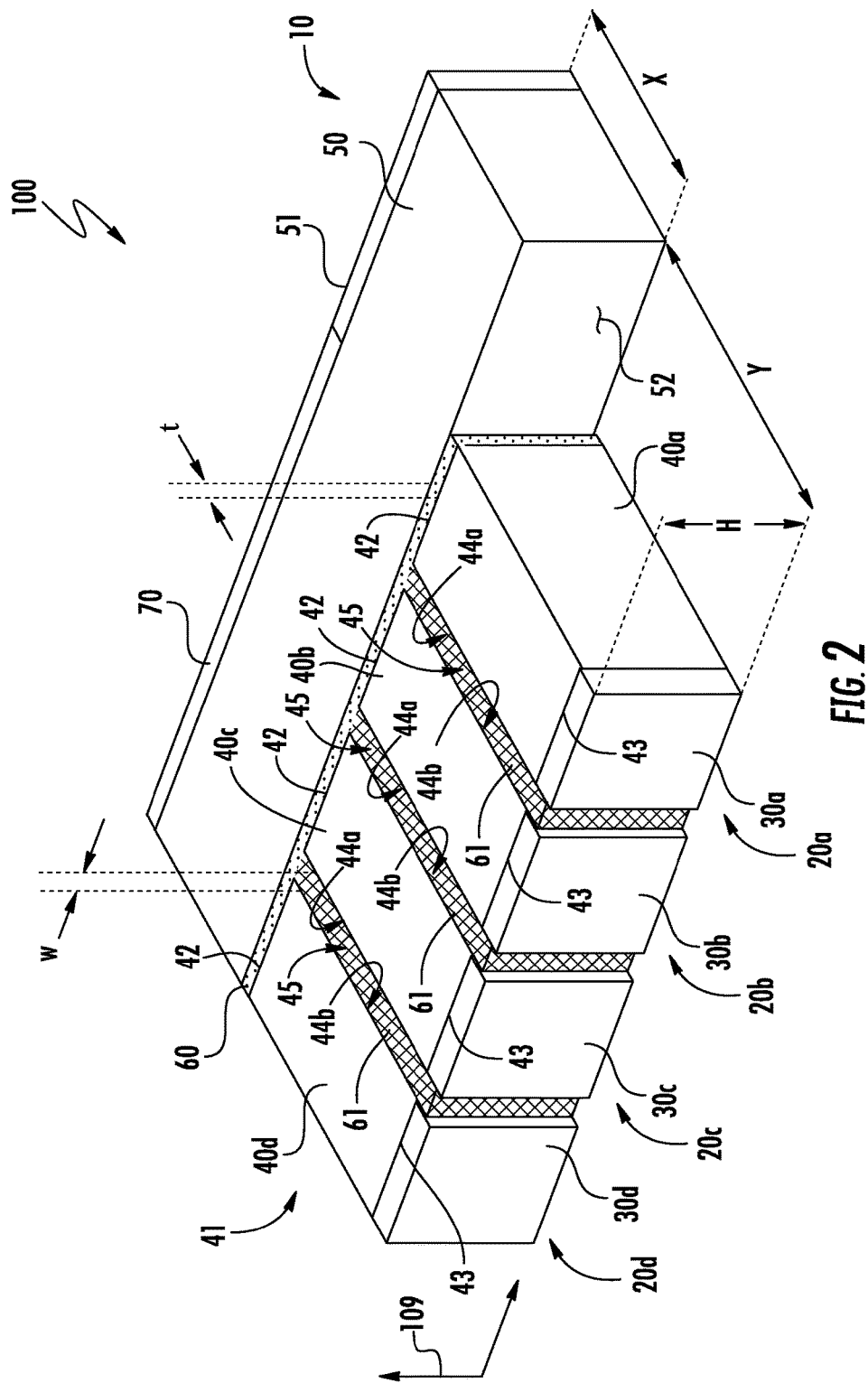
FIG. 2 is an orthogonal view of the multiplexer/demultiplexer of FIG. 1.

As illustrated in FIGS. 1 and 2, in certain embodiments, a multiplexer/demultiplexer 100 comprises a common port 10, a plurality of input/output ports 20a-20d, a capillary filter block 41 a signal-routing block 50, and an index-matching adhesive 60 between the capillary filter block 41 and the signal-routing block 50. The capillary filter block 41 comprises a plurality of component filter blocks 40a-40d secured together with a capillary adhesive 61 and each of the component filter blocks 40a-40d of the capillary filter block 41 comprises a proximal end 42, a distal end 43, and a pair of capillary side walls 44a, 44b (see FIG. 2) extending from the proximal end 42 of the component filter block 40a-40d to the distal end 43 of the component filter block 40a-40d. Each of the component filter blocks 40a-40d of the capillary filter block 41 further comprises a thin-film filter 30a-30d disposed at the distal end 43 of the component filter block 40a-40d.

Figure 7:
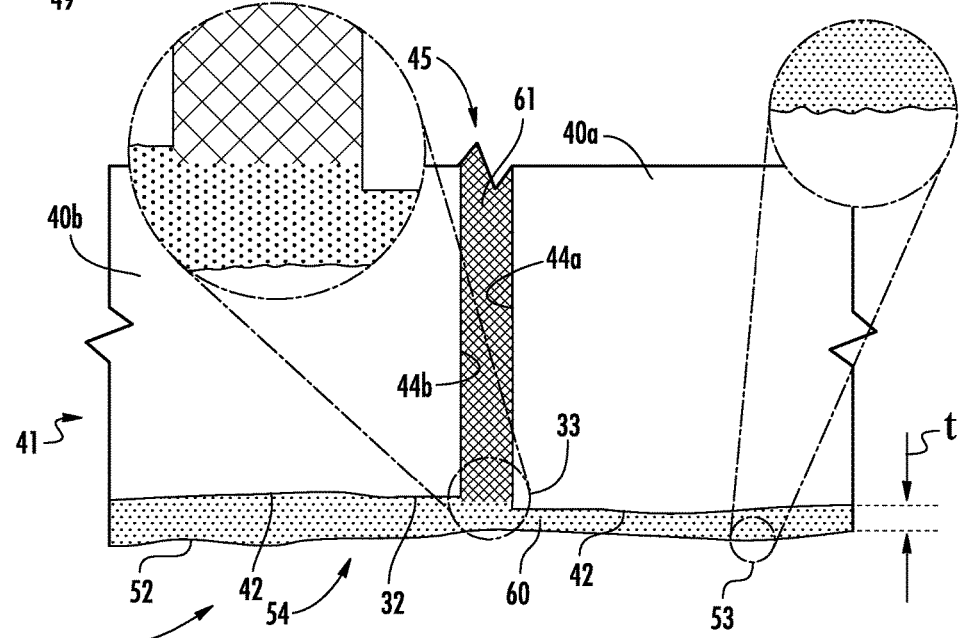
FIG. 7 illustrates the interface between the proximate ends of the component filter block strips and the index-matching adhesive.

Referring specifically to FIG. 2, in certain embodiments, the component filter blocks 40a-40d are arranged in a side-by-side progression comprising respective capillary interstices 45 between adjacent capillary side walls 44a, 44b of the component filter blocks 40a-40d. The capillary adhesive 61 resides in the capillary interstices 45 of the capillary filter block 41 to secure the component filter blocks 40a-40d to each other with the thin-film filters 30a-30d of each component filter block 40a-40d in a common filter plane (the common filter plane is a plane that extends through each of the filter blocks 40a-40d and is schematically illustrated in FIG. 2 by the axis marked with reference number 109). Additionally, the index-matching adhesive 60 may form an optical and mechanical interface between a bonding face 52 of the signal-routing block 50 and the capillary filter block 41 along the proximal ends 42 of the component filter blocks 40a-40d of the capillary filter block 41. Referring now to FIG. 7, in some embodiments a layer thickness t of the index-matching adhesive 60 is sufficient to accommodate any extra-planar surface irregularities 53 in the bonding face 52 of the signal-routing block 50 and extra-planar variations 32, 33 along the proximal ends 42 of the component filter blocks 40a-40d of the capillary filter block 41.

Referring now to FIGS. 1, 2 and 7, in some embodiments the capillary adhesive 61 and the index-matching adhesive 60 are temporally discontinuous, i.e., the two adhesives 60, 61 are presented and cured at separate times. Typically, the two adhesives 60, 61 have different compositions but it is contemplated that the same composition could be used for both adhesives 60, 61. In any case, it is contemplated that the capillary adhesive 61 will typically not extend substantially outside the capillary interstices 45 and the index-matching adhesive 60 will not extend substantially into the capillary interstices 45, such that there will be a chemical or physical demarcation between the two adhesives 60, 61, as is represented by the change in the manner in which the two adhesives 60, 61 are illustrated in FIGS. 1, 2 and 7. This demarcation being the result of the two adhesives being presented and cured at separate times, the result of the two adhesives comprising different compositions, or both.

Referring specifically to FIG. 1, the capillary filter block 41 and the signal-routing block 50 are arranged such that a multiplexed optical signal 101 entering the signal-routing block 50 through the common port 10 can pass through the signal-routing block 50 and the capillary filter block 41 in a back-and-forth progression to successive ones of the thin-film filters 30a-30d for successive wavelength-selective transmission and reflection at the input/output ports 20a-20d. Additionally, the capillary filter block 41 and the signal-routing block 50 are arranged such that demultiplexed optical signals 102a-102d entering the capillary filter block 41 through the input/output ports 20a-20d can pass through the signal-routing block 50 and the capillary filter block 41 in a back-and-forth progression for multiplexing at successive ones of the thin-film filters 30a-30d and multiplexed transmission through the common port 10.

Referring specifically to FIG. 2, in certain embodiments, the capillary interstices 45 define a height H and width W extending substantially orthogonally between adjacent capillary side walls 44a-44b, the width W being between about 10 μm and about 100 μm. In other embodiments, the capillary interstices 45 define a height H and a width W, the height H extending substantially parallel to the capillary side walls 44a-44b and measuring between about 0.3 mm and about 1 mm. Widths W and heights H within these ranges allow adhesive having room temperature viscosities within the appropriate range to fill the capillary adhesive. These dimensions give the device particular advantages, as they lower the cost and time of production and increase the precision of production. Each of these factors can be difficult to predict. In yet other embodiments, the capillary interstices 45 define dimensions that enable the capillary adhesive 61 to be drawn into a majority of an interstitial volume of respective ones of the capillary interstices 45 using capillary forces.

The capillary adhesive 61 may define a room temperature viscosity that enables the capillary adhesive 61 to be drawn into a majority of respective interstitial volumes of the capillary interstices 45 under capillary forces. In certain embodiments, the capillary adhesive 61 defines a room temperature viscosity of between about 500 cps and about 15,000 cps. In contrast, although not required, the index-matching adhesive 60 will typically define a higher room temperature viscosity of, e.g., between about 100 cps and about 15,000 cps. While the use of epoxy to bond multiple parts in multiplexers/demultiplexers may be known, advantages of using epoxies having room temperature viscosities in these ranges and capillary action has been undocumented. The quality of the bonds formed using such epoxies was unanticipated.

In particular embodiments, the capillary adhesive 61 may comprise an epoxy resin and a polyamine hardener. In certain embodiments, the index-matching adhesive 60 and the capillary adhesive 61 may comprise different or substantially identical adhesives. In certain embodiments, the refractive index of the index-matching adhesive 60 matches the refractive index of the signal-routing block 50 and the component filter blocks 40a-40d.

Referring again to FIG. 7, in certain embodiments, accommodation of the extra-planar surface irregularities 53 in the bonding face 52 and the extra-planar variations 32, 33 along the proximal ends 42 of the component filter blocks 40a-40d requires an index-matching adhesive 60 layer thickness t of between about 10 μm and about 200 μm. It will be appreciated by those skilled in the art that the magnitude of these surface irregularities 53 may, for example, be measured using a surface profilometer. In other embodiments, the layer thickness t of the index-matching adhesive 60 is between about 10 μm and about 500 μm. These ranges are particularly advantageous as they provide sufficient thickness for accurate signal propagation, that is, in interfaces without sufficient thickness collimated light may diffuse throughout the interface rather than propagating through.

In particular embodiments, the polymerization of the index-matching adhesive 60 takes place in less than about one hour at a temperature of between about 60 degrees Celsius and about 100 degrees Celsius. Such temperatures permit efficient setting times, reducing the time and resources required for production; unexpectedly lowering the cost of manufacture. In certain embodiments, the index-matching adhesive comprises an epoxy resin and a polyamine hardener.

In certain embodiments, the extra-planar variations 32, 33 along the proximal ends 42 of the component filter blocks 40a-40d are attributable to dimensional non-uniformities across the component filter blocks 40a-40d (i.e., one component filter block being slightly longer or shorter than the next), surface irregularities in the proximal ends 42 of the component filter blocks 40a-40d (i.e., bumps in the proximal ends 42 of the component filter blocks 40a-40d), non-planar portions in the proximal ends 42 of the component filter blocks 40a-40d, or combinations thereof. In particular embodiments, the layer thickness t of the index-matching adhesive 60 is at least 1 to 2 times as great as a dimension of a largest of the extra-planar variations 32, 33 along the proximal ends 42 of the component filter blocks 40a-40d.

In certain embodiments, the extra-planar surface irregularities 53 in the bonding face 52 comprise discrete surface features extending out of a bonding plane 54 defined by the bonding face 52 (i.e., bumps in an otherwise planar surface), non-planar portions of the bonding face 52 (i.e., warping, sloping, or other imperfections in the general planarity of the bonding face), or combinations thereof. In certain embodiments, the layer thickness t of the index-matching adhesive 60 is at least 1 to 10 times as great as a dimension of a largest of the extra-planar surface irregularities 53 in the bonding face 52.

Referring now to FIG. 1, in certain embodiments, the plurality of thin-film filters 30a-30d, the component filter blocks 40a-40d, and the signal-routing block 50 are arranged such that the back and forth progression of the multiplexed and demultiplexed optical signals comprises a plurality of component filter block portions 103a-103d between the thin-film filters 30a-30d and the interface between the component filter blocks 40a-40d and the signal-routing block 50; and a plurality of linear signal block portions 104a-104d between a signal reflection point 106a-106c and the interface between the component filter blocks 40a-40d and the signal-routing block 50. In other embodiments, the plurality of thin-film filters 30a-30d, the component filter blocks 40a-40d, and the signal-routing block 50 are arranged such that individual ones of the component filter block portions 103a-103d of the multiplexed and demultiplexed optical signals are greater than 0.8 mm; and individual ones of the linear signal block portions 104a-104d of the multiplexed and demultiplexed optical signals are less than 5.8 mm.

The plurality of thin-film filters 30a-30d, the component filter blocks 40a-40d, and the signal-routing block 50 may be arranged such that individual ones of the component filter block portions 103a-103d of the multiplexed and demultiplexed optical signals are between about 0.8 mm and about 2 mm. Individual ones of the linear signal block portions 104a-104d of the multiplexed and demultiplexed optical signals may be between about 0.8 mm and about 5.8 mm. In yet other embodiments, the plurality of thin-film filters 30a-30d, the component filter blocks 40a-40d, and the signal-routing block 50 are arranged to define an optical path length ratio r, where $$r = \frac{f}{s}$$

f is the length of individual ones of the component filter block portions 103a-103d of the multiplexed and demultiplexed optical signals, s is the length of individual ones of the signal-routing block portions 104a-104d of the multiplexed and demultiplexed optical signals, and $$0.1 \leq r \leq 1.7.$$

Signal path lengths and ratios as described in the preceding paragraphs are advantageous. The listed lengths and ratios permit a reduction in the size of various components such as the signal-routing block and the capillary filter block. These listed ratios, combined with other aspects of the present embodiments, reduce the need for exacting manufacturing tolerances and the amount of material consumed in the production of the assemblies, and ultimately the overall time and cost of production of the assembly.

Referring specifically to FIG. 2, in particular embodiments, the signal-routing block 50 defines a routing block thickness dimension x extending orthogonally between a signal-routing reflector 70 on a first side of the signal-routing block and an interface between the signal-routing block 50 and the component filter blocks 40a-40d on a second side of the signal-routing block 50. The routing block thickness dimension x may be less than about 5.7 mm. Similarly, the plurality of component filter blocks 40a-40d may define a component filter block thickness dimension y extending orthogonally between the thin-film filters 30a-30d and the interface between the component filter blocks 40a-40d and the signal-routing block 50. The component filter block thickness dimension y may be less than about 2 mm.

In yet other embodiments, the signal-routing block thickness dimension x and the filter block thickness dimension y define a dimensional ratio z, where: z=y/x
and $0.1 \leq z \leq 1.7$.

Component sizes and ratios as described in the preceding paragraphs are advantageous. The listed lengths and ratios describe a precisely calculated reduction in the size of various components such as the signal-routing block and the capillary filter block. This size reduction combined with other aspects of the present embodiments lowers the need for exacting manufacturing tolerances, and thus the overall time and cost of production of the assembly.

In particular embodiments, the signal-routing reflector 70 is positioned over the surface 51 of the signal-routing block 50 opposite the interface between the signal-routing block 50 and the capillary filter block 41. In other embodiments, the signal-routing reflector 70 comprises a single continuous reflecting element or a plurality of individual reflectors.

In particular embodiments, the component filter blocks 40a-40d and the signal-routing block 50 comprise glass blocks characterized by a refractive index of between about 1.523 and about 1.517, at 1300 nm. In particular embodiments, each of the plurality of thin-film filters 30a-30d is configured such that the wavelength-selective transmission and reflection at the input/output ports 20a-20d is operative between about 1260 nm and about 1360 nm and is characterized by a bandwidth and channel spacing of between about 10 nm and about 30 nm Referring to FIG. 1, in certain embodiments, the common port 10 of the multiplexer/demultiplexer 100 comprises a surface region 51 of the signal-routing block 50 and the plurality of input/output ports 20a-20d of the multiplexer/demultiplexer 100 comprise respective surface regions 31a-31d of the thin-film filters 30a-30d. In certain other embodiments, the surface region 51 comprising the common port 10 of the multiplexer/demultiplexer 100 comprises an anti-reflection film 57 formed over the surface region 51 of the signal-routing block 50 and the surface regions 31a-31d comprising the input/output ports 20a-20d of the multiplexer/demultiplexer 100 comprise anti-reflection films 21a-21d formed over respective surfaces of the thin-film filters 30a-30d. These anti-reflection films may comprise a multilayer thin-film filter structure or a textured lens surface.

Figure 3:
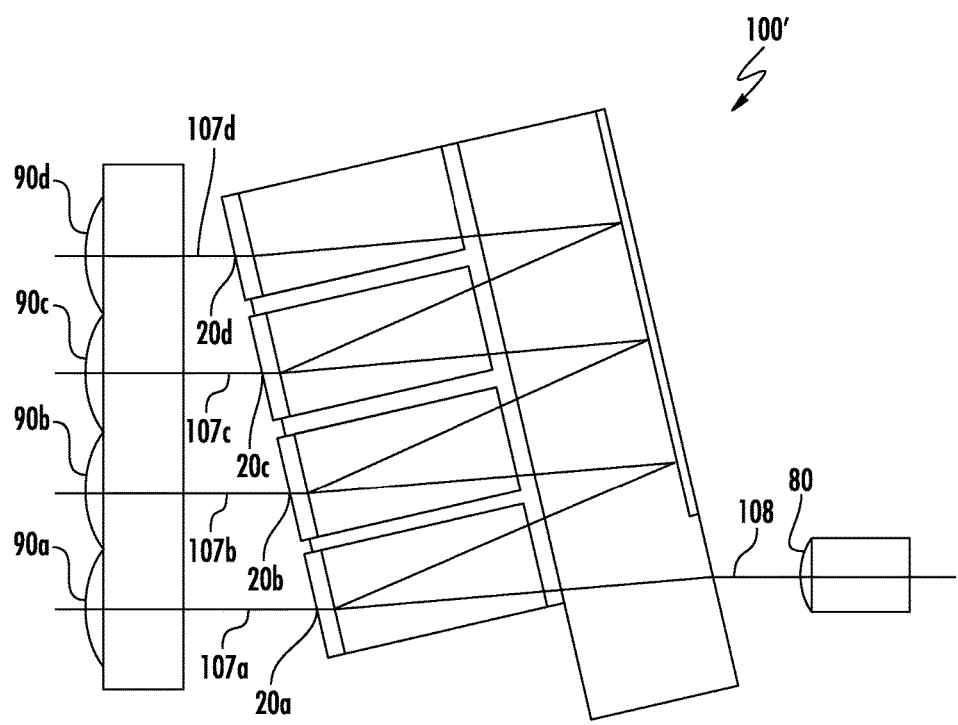
FIG. 3 illustrates a multiplexer/demultiplexer comprising an input/output microlens array and a common port lens.

Referring now to FIG. 3, the multiplexer/demultiplexer 100' may further comprise an input/output microlens array 90a-d and a common port lens 80. The input/output microlens array 90a-d may be optically configured to direct a plurality of collimated optical signals 107a-107d to the plurality of input/output ports 20a-20d in a multiplexing mode and to focus a plurality of demultiplexed optical signals propagating from the input/output ports 20a-20d in a demultiplexing mode. The common port lens 80 may be optically configured to direct a collimated, multi-spectral optical signal 108 to the common port 10 in the demultiplexing mode and to focus a multiplexed optical signal 108 propagating from the common port 10 in the multiplexing mode.

Figure 4:
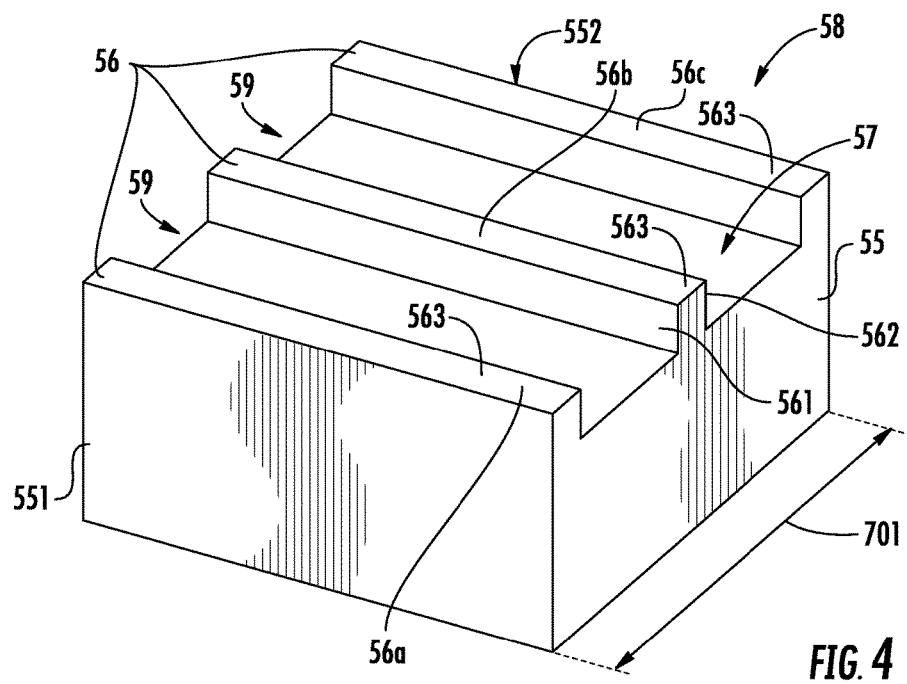
FIG. 4 illustrates a reference fixture in accordance with the present disclosure.
Figure 5:
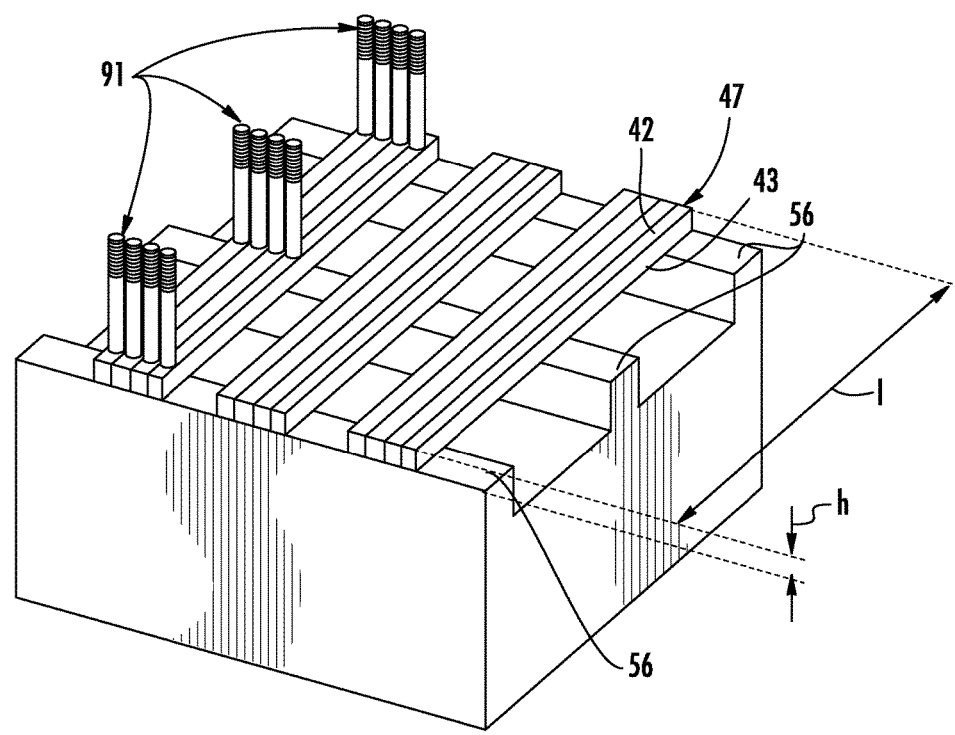
FIG. 5 illustrates the reference fixture of FIG. 4 and several component filter block strips.
Figure 6:
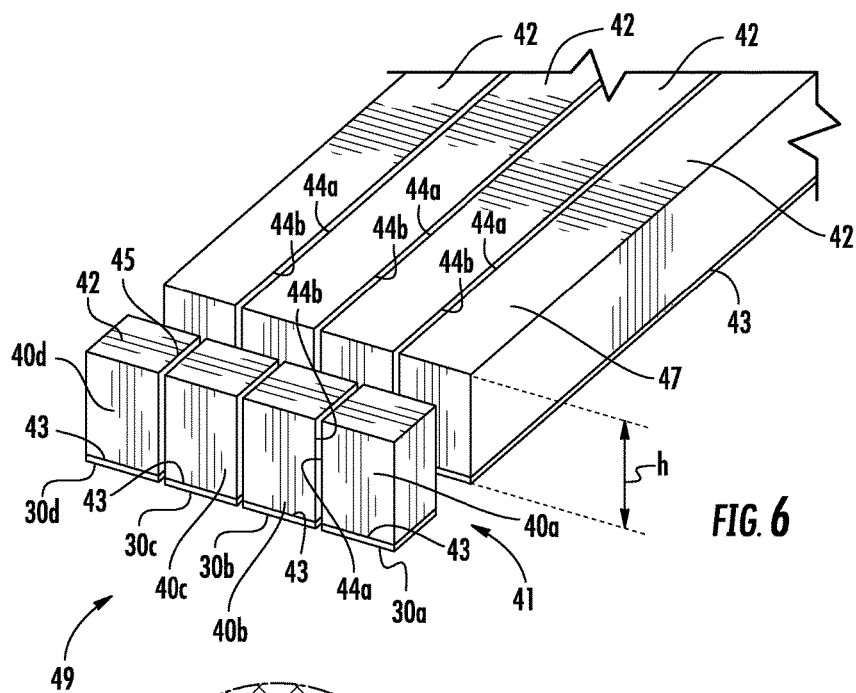
FIG. 6 illustrates a capillary filter block cut from an assembly of component filter block strips.
Figure 8:
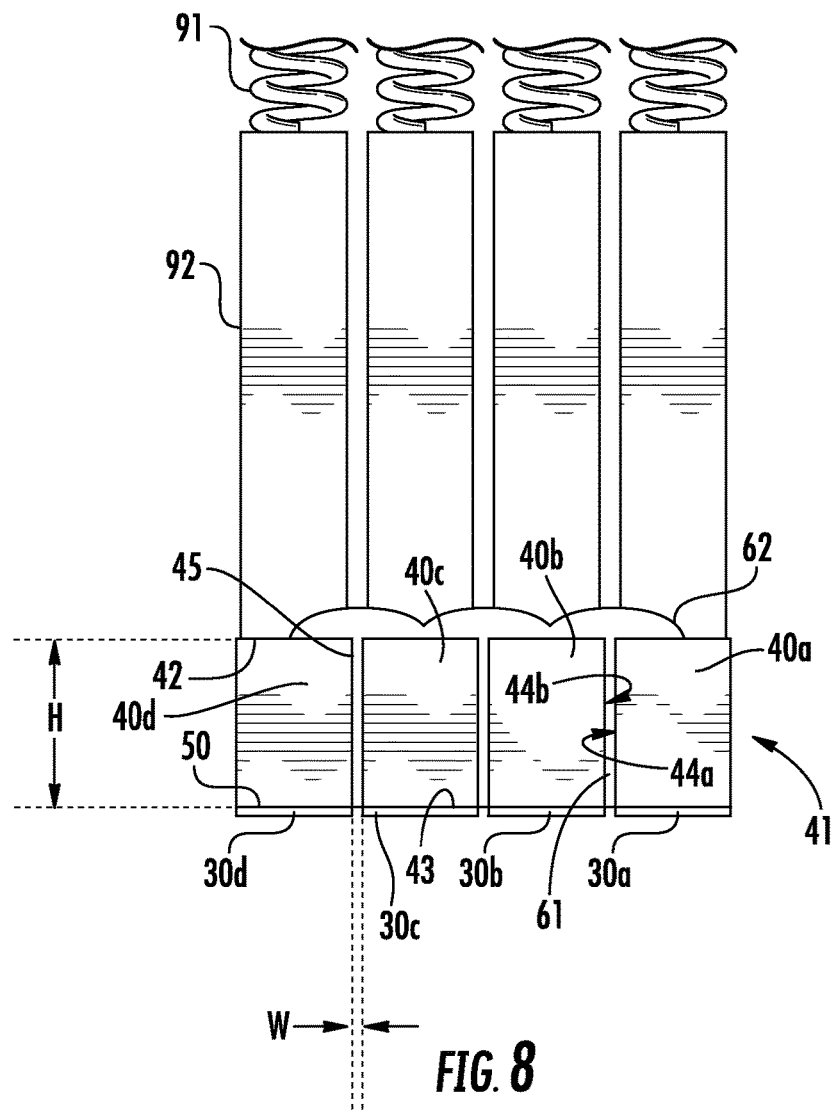
FIG. 8 illustrates capillary adhesive being applied to the component filter block strips and the component filter blocks strips being pressed by the compression springs.

Referring now to FIGS. 4, 5, 6, and 8 a method of producing a plurality of capillary filter blocks 41 will be described. According to the method, a plurality of component filter block strips 47 (FIG. 5) are provided. Each filter block strip 47 comprises a proximal end 42, a distal end 43, and two side walls 44a, 44b (FIG. 6) comprising a height dimension h and a length dimension l. Referring now to FIG. 6, each distal end 43 comprises a thin-film filter 30a-30d. Referring specifically to FIG. 4, a reference fixture 55 is provided and comprises a plurality of alignment platforms 56 extending from a common surface 57 of the reference fixture 55. The alignment platforms 56 each comprise a first side 561, a second side 562, and a substantially planar top 563. The planar tops 563 of the alignment platforms 56 collectively define a common alignment plane 58. Referring now to FIG. 5, the plurality of component filter block strips 47 are positioned such that (i) respective length dimensions l of the component filter block strips 47 are aligned with the length dimension 701 (FIG. 4) of the reference fixture 55, (ii) the component filter block strips 47 lie atop at least two of the alignment platforms 56 in a parallel side-by-side progression, (iii) the plurality of thin-film filters 30a-30d at the distal ends 43 of the component filter block strips 47 contact the alignment platforms 56 in the common alignment plane 58, and (iv) adjacent side walls 44a-44b of the positioned component filter block strips 47 form capillary interstices 45 between adjacent component filter block strips 47. Referring now to FIG. 8, a capillary adhesive 61 is applied to the proximal end 42 of the component filter block strips 47 (FIG. 6) such that the capillary adhesive 61 is distributed within the capillary interstices 45 between the component filter block strips 47 at least by capillary force. The capillary adhesive 61 is cured such that the plurality of component filter blocks 40a-40d form a capillary filter block strip 49 (FIG. 6). The capillary filter block strips 49 are then diced to produce a plurality of capillary filter blocks 41, each of the capillary filter blocks 41 comprising component filter blocks 40a-40d.

In particular embodiments, the component filter block strips 47 are provided by cutting the filter blocks strips 47 from a filter block substrate at a uniform width of, for example, between about 0.5 mm and about 2.5 mm. Widths in this range are particularly advantageous. Component filter blocks having this dimension meet the previously mentioned aspect ratios such that light signals can propagate back and forth for successive selective wavelength transmission and are also sufficiently small such that product is not wasted, lowering the cost of manufacture. The filter block substrate may comprise a filter coating that forms the thin-film filters 30a-30d of each of the component filter block strips 47 after the filter block strips 47 are cut from the filter block substrate.

Referring to FIG. 4, in still other embodiments, the length dimension 701 of the reference fixture 55 extends between two end faces 551 and 552 of the reference fixture 55. The alignment platforms 56 are spaced along the length dimension 701 and are oriented such that the first side 561 and second side 562 of the alignment platforms 56 are orthogonal to the length dimension 701 of the reference fixture 55. In certain embodiments, the alignment platforms 56 comprise at least two end platforms 56a and 56c and at least one intermediate platform 56b collectively spaced along the length dimension 701 of the reference fixture 55 to define support gaps 59 between the spaced alignment platforms 56.

These support gaps permit more reliable alignment of the component filter block strips 47 along the reference fixture 55.

Referring to FIG. 5, in still other embodiments, the component filter block strips 47 are oriented substantially parallel to the length dimension 701 (FIG. 4) of the reference fixture 55 and orthogonal to the first and second sides 561 and 562 of the alignment platforms 56. In certain embodiments, the component filter block strips 47 are compressed against the plurality of alignment platforms 56 using a force additional to the force of gravity. For example, with reference to FIG. 8, the compression of the component filter block strips 47 may be facilitated by a plurality of compression springs 91 and corresponding compression columns 92. As shown in FIG. 5, these springs 91 are configured to compress respective ones of the component filter block strips 47 against the plurality of alignment platforms 56. The compression springs 91 may be vertically aligned with the plurality of alignment platforms 56.

As is illustrated in FIG. 8, the capillary adhesive 61 may be applied at a proximal end 42 of adjacent component filter blocks 40a-40d over each of the capillary interstices 45 and is drawn into each of the capillary interstices 45 by capillary forces. Excess capillary adhesive 62 may be removed from the proximal end 42 of the capillary filter block 41 after the capillary adhesive 61 is drawn into each of the capillary interstices 45. In some embodiments, the plurality of component filter block strips 47 are held atop the alignment platforms 56 (FIG. 5) until the capillary adhesive 61 cures. It is contemplated that, the capillary adhesive 61 can be cured in a variety of ways, including by means of ultra-violet light or thermal exposure.

As is illustrated in FIG. 6, the component filter block strips 47 may be diced along a dimension substantially orthogonal to the respective length dimension 1 (FIG. 5) of the component filter block strips 47 to form the capillary filter blocks 41. The capillary adhesive 61 has been left out of FIG. 6 for clarity.

Referring now to FIG. 1, still other embodiments of the present disclosure are directed to a method of producing a multiplexer/demultiplexer 100 comprising a common port 10, a plurality of input/output ports 20a-20d, a capillary filter block 41, a capillary adhesive 61, a signal-routing block 50, and an index-matching adhesive 60, the method comprising forming an optical and mechanical interface between a bonding face 52 of the signal-routing block 50 and a bonding face 48 of the capillary filter block 41 using an index-matching adhesive 60, wherein the capillary filter block 41 comprises a plurality of component filter blocks 40a-40d. In particular embodiments, each of the component filter blocks 40a-40d may comprise a proximal end 42 and a distal end 43, and each of the component filter blocks 40a-40d of the capillary filter block 41 may further comprise a thin-film filter 30a-30d disposed at the distal end 43 of the component filter block 40a-40d. The proximal ends 42 of the plurality of component filter blocks 40a-40d may form the bonding face 48 of the capillary filter block 41, and a layer thickness t (FIG. 2) of the index-matching adhesive 60 may be sufficient to accommodate, referring to FIG. 7, extra-planar surface irregularities 53 in the bonding face 52 of the signal-routing block 50 and extra-planar variations 32, 33 along the proximal ends 42 of the component filter blocks 40a-40d of the capillary filter block 41; such that the signal-routing block 50 and the capillary filter block 41 are aligned to allow a multiplexed optical signal 108 (FIG. 3) entering, now referring briefly to FIG. 1, the signal-routing block 50 through the common port 10 to pass through the signal-routing block 50 and the capillary filter block 41 in a back-and-forth progression to successive thin-film filters 30a-30d for wavelength-selective transmission and reflection at the input/output ports 20a-20d, and demultiplexed optical signals 107a-107d entering the capillary filter block 41 through the input/output ports 20a-20d can pass through the signal-routing block 50 and the capillary filter block 41 in a back-and-forth progression for multiplexing at the thin-film filters 30a-30d and multiplexed transmission through the common port 10. In particular embodiments, the index-matching adhesive 60 may be cured such that the signal-routing block 50 and the capillary filter block 41 are in fixed alignment.

Referring to FIG. 7, it is contemplated that the capillary adhesive 61 may be cured before forming the optical and mechanical interface between the bonding face 52 of the signal-routing block 50 and the bonding face 48 (FIG. 1) of the capillary filter block 41 using the index-matching adhesive 60. In certain embodiments, the capillary filter block 41 and the signal-routing block 50 are held together until the index-matching adhesive 60 cures. The optical and mechanical interface may be formed by applying the index-matching adhesive 60 to the bonding face 52 of the signal-routing block 50, the bonding face 48 of the capillary filter block 41, or both. The index-matching adhesive 60 can be cured using UV light or thermal exposure, or any conventional or yet-to-be developed curing means.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present embodiments, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A multiplexer/demultiplexer comprising:
a common port;
a plurality of input/output ports;
a capillary filter block;
a capillary adhesive;
a signal-routing block; and
an index-matching adhesive, wherein
the capillary filter block comprises a plurality of component filter blocks,
each of the component filter blocks of the capillary filter block comprises a proximal end, a distal end, and a pair of capillary side walls extending from the proximal end of the component filter block to the distal end of the component filter block,
each of the component filter blocks of the capillary filter block further comprises a thin-film filter disposed at the distal end of the component filter block,
the component filter blocks are arranged side-by-side comprising respective capillary interstices between adjacent capillary side walls of the component filter blocks,
the capillary adhesive resides in the capillary interstices of the capillary filter block to secure the component filter blocks to each other with the thin-film filters of each component filter block in a common filter plane,
the index-matching adhesive forms an optical and mechanical interface between a bonding face of the signal-routing block and the capillary filter block along the proximal ends of the component filter blocks of the capillary filter block,
a layer thickness of the index-matching adhesive is sufficient to accommodate extra-planar surface irregularities in the bonding face of the signal routing block and extra-planar variations along the proximal ends of the component filter blocks of the capillary filter block,
the capillary adhesive and the index-matching adhesive are temporally discontinuous,
the capillary filter block and the signal-routing block are arranged such that a multiplexed optical signal entering the signal-routing block through the common port can pass through the signal-routing block and the capillary filter block in a back-and-forth progression to successive ones of the thin-film filters for successive wavelength-selective transmission and reflection at the input/output ports, and
the capillary filter block and the signal-routing block are arranged such that demultiplexed optical signals entering the capillary filter block through the input/output ports can pass through the signal-routing block and the capillary filter block in a back-and-forth progression for multiplexing at successive ones of the thin-film filters and multiplexed transmission through the common port.

2. The multiplexer/demultiplexer as claimed in claim 1 wherein the capillary interstices define a width extending substantially orthogonally between adjacent capillary side walls of between about 10 µm and about 100 µm.

3. The multiplexer/demultiplexer as claimed in claim 1 wherein the capillary interstices define a height extending substantially parallel to the capillary side walls of between about 0.3 mm and about 1 mm.

4. The multiplexer/demultiplexer as claimed in claim 1 wherein the capillary interstices define dimensions that enable the capillary adhesive to be drawn into a majority of an interstitial volume of respective ones of the capillary interstices using capillary forces.

5. The multiplexer/demultiplexer as claimed in claim 1 wherein the capillary adhesive does not extend substantially outside the capillary interstices and the index-matching adhesive does not extend substantially into the capillary interstices.

6. The multiplexer/demultiplexer as claimed in claim 1 wherein the multiplexer/demultiplexer comprises a chemical or physical demarcation between the capillary adhesive and the index-matching adhesive.

7. The multiplexer/demultiplexer as claimed in claim 1 wherein the capillary adhesive defines a room temperature viscosity that enables the capillary adhesive to be drawn into a majority of respective interstitial volumes of the capillary interstices under capillary forces.

8. The multiplexer/demultiplexer as claimed in claim 7 wherein the capillary adhesive defines a room temperature viscosity of between about 500 cps and about 15,000 cps.

9. The multiplexer/demultiplexer as claimed in claim 8 wherein the index-matching adhesive defines a room temperature viscosity of between about 100 cps and about 50,000 cps.

10. The multiplexer/demultiplexer as claimed in claim 1 wherein the accommodation of the extra-planar surface irregularities in the bonding face and the extra-planar variations along the proximal ends of the component filter blocks require an index-matching adhesive layer thickness of between about 10 µm and about 200 µm.

11. The multiplexer/demultiplexer as claimed in claim 1 wherein the layer thickness of the index-matching adhesive is between about 10 µm and about 200 µm.

12. The multiplexer/demultiplexer as claimed in claim 1 wherein the extra-planar variations along the proximal ends of the component filter blocks are attributable to dimensional non-uniformities across the component filter blocks, surface irregularities in the proximal ends of the component filter blocks, non-planar portions in the proximal ends of the component filter blocks, or combinations thereof.

13. The multiplexer/demultiplexer as claimed in claim 1 wherein the layer thickness of the index-matching adhesive is at least 1 to 2 times as great as a dimension of a largest of the extra-planar variations along the proximal ends of the component filter block.

14. The multiplexer/demultiplexer as claimed in claim 1 wherein the extra-planar surface irregularities in the bonding face comprise discrete surface features extending out of a bonding plane defined by the bonding face, non-planar portions of the bonding face, or combinations thereof.

15. The multiplexer/demultiplexer as claimed in claim 1 wherein the layer thickness of the index-matching adhesive is at least 1 to 10 times as great as a dimension of a largest of the extra-planar surface irregularities in the bonding face.

16. The multiplexer/demultiplexer as claimed in claim 1 wherein:
the signal-routing block defines a routing block thickness dimension x extending orthogonally between a reflective coating on a first side of the signal-routing block and an interface between the signal-routing block and the component filter blocks on a second side of the signal-routing block, and x is less than about 5.7 mm; and
the plurality of component filter blocks define a component filter block thickness dimension y extending orthogonally between the thin-film filters and the interface between the component filter blocks and the signal-routing block, and y is less than about 2 mm.

17. The multiplexer/demultiplexer as claimed in claim 1 wherein:

the signal-routing block defines a signal-routing block thickness dimension x extending orthogonally between a reflective coating on a first side of the signal-routing block and an interface between the signal-routing block and the component filter blocks on a second side of the signal-routing block;

the plurality of component filter blocks define a filter block thickness dimension y extending orthogonally between the thin-film filters and the interface between the component filter blocks and the signal-routing block; and the dimensions x and y define a dimensional ratio z, where:

$$z = \frac{y}{x}$$

and $0.1 \leq z \leq 1.7$.

18. The multiplexer/demultiplexer as claimed in claim 1 wherein:

the multiplexer/demultiplexer further comprises an input/output microlens array and a common port lens;

the input/output port microlens array is optically configured to direct a plurality of collimated optical signals to the plurality of input/output ports in a multiplexing mode and to focus a plurality of demultiplexed optical signals propagating from the input/output ports in a demultiplexing mode; and the common port lens is optically configured to direct a collimated, multi-spectral optical signal to the common port in the demultiplexing mode and to focus a multiplexed optical signal propagating from the common port in the multiplexing mode.

19. A multiplexer/demultiplexer comprising:

a common port;

a plurality of input/output ports;

a capillary filter block;

a capillary adhesive;

a signal-routing block; and an index-matching adhesive, wherein the capillary filter block comprises a plurality of component filter blocks, each of the component filter blocks of the capillary filter block comprises a proximal end, a distal end, and a pair of capillary side walls extending from the proximal end of the component filter block to the distal end of the component filter block, each of the component filter blocks of the capillary filter block further comprises a thin-film filter disposed at the distal end of the component filter block, the component filter blocks are arranged in a side-by-side progression comprising respective capillary interstices between adjacent capillary side walls of the component filter blocks, the capillary adhesive resides in the capillary interstices of the capillary filter block to secure the component filter blocks to each other with the thin-film filters of each component filter block in a common filter plane, the index-matching adhesive forms an optical and mechanical interface between a bonding face of the signal-routing block and the capillary filter block along the proximal ends of the component filter blocks of the capillary filter block, the multiplexer/demultiplexer comprises a chemical or physical demarcation between the capillary adhesive and the index-matching adhesive, a layer thickness of the index-matching adhesive is sufficient to accommodate extra-planar surface irregularities in the bonding face of the signal routing block and extra-planar variations along the proximal ends of the component filter blocks of the capillary filter block, the capillary filter block and the signal-routing block are arranged such that a multiplexed optical signal entering the signal-routing block through the common port can pass through the signal-routing block and the capillary filter block in a back-and-forth progression to successive ones of the thin-film filters for successive wavelength-selective transmission and reflection at the input/output ports, the capillary filter block and the signal-routing block are arranged such that demultiplexed optical signals entering the capillary filter block through the input/output ports can pass through the signal-routing block and the capillary filter block in a back-and-forth progression for multiplexing at successive ones of the thin-film filters and multiplexed transmission through the common port.

20. A method of producing a multiplexer/demultiplexer comprising a common port, a plurality of input/output ports, a capillary filter block, a capillary adhesive, a signal-routing block, and an index-matching adhesive, the method comprising:

forming an optical and mechanical interface between a bonding face of the signal-routing block and a bonding face of the capillary filter block using an index-matching adhesive, wherein the capillary filter block comprises a plurality of component filter blocks, each of the component filter blocks comprises a proximal end and a distal end, each of the component filter blocks of the capillary filter block further comprises a thin-film filter disposed at the distal end of the component filter block, the proximal ends of the plurality of component filter blocks form the bonding face of the capillary filter block, and a layer thickness of the index-matching adhesive is sufficient to accommodate extra-planar surface irregularities in the bonding face of the signal routing block and extra-planar variations along the proximal ends of the component filter blocks of the capillary filter block;

aligning the signal-routing block and capillary filter block such that a multiplexed optical signal entering the signal-routing block through the common port can pass through the signal-routing block and the capillary filter block in a back-and-forth progression to successive ones of the thin-film filters for successive wavelength-selective transmission and reflection at the input/output ports, and demultiplexed optical signals entering the capillary filter block through the input/output ports can pass through the signal-routing block and the capillary filter block in a back-and-forth progression for multiplexing at successive ones of the thin-film filters and multiplexed transmission through the common port; and curing the index-matching adhesive such that the signal-routing block and the capillary filter block are in fixed alignment.

21. The method of claim 20 wherein:

each of the component filter blocks of the capillary filter block further comprises a pair of capillary side walls extending from the proximal end of the component filter block to the distal end of the component filter block;

the component filter blocks are arranged in a side-by-side progression comprising respective capillary interstices between adjacent capillary side walls of the component filter blocks;

the capillary adhesive resides in the capillary interstices of the capillary filter block to secure the component filter blocks to each other with the thin-film filters of each component filter block in a common filter plane; and the capillary adhesive is cured before forming the optical and mechanical interface between the bonding face of the signal-routing block and the bonding face of the capillary filter block using the index-matching adhesive.

* * * * *